(12) United States Patent
Kim

(10) Patent No.: US 12,375,162 B2
(45) Date of Patent: Jul. 29, 2025

(54) METHOD AND APPARATUS FOR TRANSMITTING SIGNAL OF WIRELESS DEVICE FOR UNMANNED AIRCRAFT SYSTEM

(71) Applicant: ELECTRONICS AND TELECOMMUNICATIONS RESEARCH INSTITUTE, Daejeon (KR)

(72) Inventor: Hee Wook Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 449 days.

(21) Appl. No.: 17/872,478

(22) Filed: Jul. 25, 2022

(65) Prior Publication Data

US 2023/0030130 A1    Feb. 2, 2023

(30) Foreign Application Priority Data

Jul. 27, 2021    (KR) ........................ 10-2021-0098473

(51) Int. Cl.
| | |
|---|---|
| *H04B 7/185* | (2006.01) |
| *H04J 13/00* | (2011.01) |
| *H04L 5/00* | (2006.01) |
| *H04W 72/044* | (2023.01) |

(Continued)

(52) U.S. Cl.
CPC ...... *H04B 7/18504* (2013.01); *H04J 13/0062* (2013.01); *H04L 5/0048* (2013.01); *H04W 72/044* (2013.01); *H04W 72/30* (2023.01); *H04W 84/12* (2013.01)

(58) Field of Classification Search
CPC .............. H04B 7/18504; H04J 13/0062; H04J 13/0074; H04J 11/0069; H04L 5/0048; H04L 5/003; H04L 5/0094; H04L 27/2602; H04L 5/0012; H04L 5/0044; H04L 5/1469; H04L 27/2613; H04W 72/044;
(Continued)

(56) References Cited

U.S. PATENT DOCUMENTS

2004/0076239 A1   4/2004   Yu et al.
2014/0204825 A1*   7/2014   Ekpenyong ........... H04L 5/0053
                                                                 370/312

(Continued)

FOREIGN PATENT DOCUMENTS

KR   10-2010-0062522 A   6/2010
KR   10-2015-0024300      3/2015

(Continued)

OTHER PUBLICATIONS

Jim Griner, "Unmanned Aircraft Systems (UAS) Integration in the National Airspace System (NAS) Project", ICNS Plenary, Apr. 22, 2015; pp. 1-21.

*Primary Examiner* — Ricky Q Ngo
*Assistant Examiner* — David M Kayal
(74) *Attorney, Agent, or Firm* — KILE PARK REED & HOUTTEMAN PLLC

(57) ABSTRACT

A method and device for transmitting and receiving signals with a terrestrial station by using a radio frame including five subframes each of which includes a plurality of slots used for the uplink signal and/or the downlink signal are provided.

15 Claims, 12 Drawing Sheets

(51) Int. Cl.
*H04W 72/30* (2023.01)
*H04W 84/12* (2009.01)

(58) Field of Classification Search
CPC . H04W 72/30; H04W 84/12; H04W 72/0446; H04W 74/0833
See application file for complete search history.

(56) References Cited

U.S. PATENT DOCUMENTS

| | | | |
|---|---|---|---|
| 2015/0036560 A1* | 2/2015 | Kim | H04W 72/23 370/280 |
| 2018/0136645 A1* | 5/2018 | Hong | H04W 72/0453 |
| 2019/0113912 A1* | 4/2019 | Olson | G05D 1/0022 |
| 2019/0261343 A1 | 8/2019 | Noh et al. | |
| 2019/0342888 A1* | 11/2019 | Hosseini | H04W 72/1215 |
| 2021/0026521 A1 | 1/2021 | Lee | |
| 2021/0385848 A1* | 12/2021 | Hwang | H04L 5/0053 |
| 2022/0286247 A1* | 9/2022 | Liu | H04L 5/0051 |
| 2022/0322156 A1* | 10/2022 | Kim | H04W 76/28 |

FOREIGN PATENT DOCUMENTS

| | | |
|---|---|---|
| KR | 10-2015-0117879 A | 10/2015 |
| KR | 10-2019-0095184 | 8/2019 |
| KR | 10-2019-0109858 A | 9/2019 |
| KR | 10-2020-0007727 A | 1/2020 |
| KR | 20200007727 * | 1/2020 |

* cited by examiner

METHOD AND APPARATUS FOR TRANSMITTING SIGNAL OF WIRELESS DEVICE FOR UNMANNED AIRCRAFT SYSTEM

CROSS-REFERENCE TO RELATED APPLICATION

This application claims priority to and the benefit of Korean Patent Application No. 10-2021-0098473 filed in the Korean Intellectual Property Office on Jul. 27, 2021, the entire contents of which are incorporated herein by reference.

BACKGROUND OF THE INVENTION

(a) Field of the Invention

This description relates to a method and apparatus for transmitting a signal of an onboard wireless device in an unmanned aerial vehicle.

(b) Description of the Related Art

The data link of the UAV (unmanned aerial vehicle) system can be divided into communication link for control and communication link for a mission. The data link for a mission is a data link related to the conduct of the mission and is generally composed of wide band than the communication link for control. On the other hand, the communication link for control refers to a link for transmitting data related to UAV flight control, status monitoring, and system management.

Currently, LTE mobile communication technology is being considered the main communication link for controlling the UAV and transmitting mission data for stable operation and the mission of drones (e.g., disaster security drones) to enhance public safety through disaster security prevention and response by using the UAVs. The LTE mobile communication technology can provide QoS management with greater coverage than existing low-power communication technology of an unlicensed band such as WiFi. However, the LTE mobile communication technology also has a problem such that the communication can be disrupted outside the coverage such as mountains and sea. Considering that the UAV control is required anytime and anywhere in disaster and security situations, an auxiliary communication link is essential for stable control and mission of UAV even in areas where the LTE mobile communication cannot be used as the main communication link.

For this purpose, unlicensed band communication technologies such as WiFi can be considered, but there are coverage limitations due to low-power limitations and cross/interference, so it is difficult to ensure a stable communication link.

The above information disclosed in this Background section is only for enhancement of understanding of the background of the invention, and therefore it may contain information that does not form the prior art that is already known in this country to a person of ordinary skill in the art.

SUMMARY OF THE INVENTION

An embodiment provides a wireless device mounted on an unmanned aerial vehicle.

Another embodiment provides a communication method for a wireless device.

Another embodiment provides a communication system for unmanned aerial vehicles.

According to an embodiment, a wireless device mounted on an unmanned aerial vehicle is provided. The wireless device includes: a processor, a memory, and a communication device, wherein the processor is connected to the communication device and executes a program stored in the memory to perform: transmitting a downlink signal to a terrestrial station by using a radio frame and receiving an uplink signal from the terrestrial station by using the radio frame and wherein the radio frame includes five subframes and each subframe includes a plurality of slots used for the uplink signal and/or the downlink signal.

In an embodiment, at least one subframe of the five subframes may include a slot in which both the uplink signal and the downlink signal is not allocated.

In an embodiment, when at least one subframe of the five subframes includes both an uplink slot to which the uplink signal is allocated and a downlink slot to which the downlink signal is allocated, a guard interval may be included between the uplink slot and the downlink slot.

In an embodiment, a time length of the guard interval may be shorter than the uplink slot and the downlink slot.

In an embodiment, at least one slot of the plurality of slots may include a broadcasting channel or a random access (RA) channel.

In an embodiment, a slot of the plurality of slots may include a plurality of single carrier-frequency domain equalization (SC-FDE) blocks and the SC-FDE block may include an SC-FDE data block and an SC-FDE pilot block.

In an embodiment, a number of the SC-FDE pilot blocks may be less than a number of the SC-FDE data blocks and the SC-FDE pilot block may be positioned at predetermined intervals within the one slot.

In an embodiment, the subframe may include a first preamble SC-FDE symbol and a second preamble SC-FDE symbol and a plurality of slots may be positioned after the first preamble SC-FDE symbol and the second preamble SC-FDE symbol.

In an embodiment, a block sequence corresponding to the first preamble SC-FDE symbol may be generated based on a cell identifier and a Zadoff-Chu sequence having a length of prime number.

In an embodiment, a block sequence corresponding to the second preamble SC-FDE symbol and a pilot block sequence may be generated according to a group hopping pattern and a Zadoff-Chu sequence having a length of even number.

According to another embodiment, a communication method for a wireless device is provided. The communication method includes: transmitting a downlink signal to a terrestrial station by using a radio frame or receiving an uplink signal from the terrestrial station by using the radio frame, wherein the radio frame includes five subframes and each subframe includes a plurality of slots used for the uplink signal and/or the downlink signal.

In an embodiment, the communication method may further include determining allocation of a slot for the uplink signal or the downlink signal by the wireless device and a terrestrial station.

In an embodiment, the transmitting a downlink signal to a terrestrial station by using a radio frame or receiving an uplink signal from the terrestrial station by using the radio frame may include: receiving the uplink signal through first two subframes among the five subframes; receiving the uplink signal through a slot in a first part of a third subframe among the five subframes and transmitting the downlink signal through a slot after the slot in the first part of the third subframe; and transmitting the downlink signal through last two subframes among the five subframes.

In an embodiment, the transmitting a downlink signal to a terrestrial station by using a radio frame or receiving an uplink signal from the terrestrial station by using the radio frame may include: transmitting/receiving no signal with the terrestrial station in first two subframes and a slot in a first part of a third subframe among the five subframes; and transmitting the downlink signal through a slot after the slot in the first part of the third subframe.

In an embodiment, the transmitting a downlink signal to a terrestrial station by using a radio frame or receiving an uplink signal from the terrestrial station by using the radio frame may include: receiving the uplink signal from the terrestrial station in a first slot of a first subframe among the five subframes; and transmitting the downlink signal to the terrestrial station through a slot after the first slot in the first subframe or some slots in the remaining subframes.

In an embodiment, the transmitting a downlink signal to a terrestrial station by using a radio frame or receiving an uplink signal from the terrestrial station by using the radio frame further may include: receiving a broadcasting signal from the terrestrial station through the second slot following the first slot in the first subframe.

In an embodiment, a slot in a third subframe among the five subframes may be allocated for random access (RA) of other wireless devices.

In an embodiment, a guard interval of a predetermined time length may be allocated between a slot in which the uplink signal is received and a slot in which the downlink signal is transmitted.

In an embodiment, when the radio frame is synchronized with respect to the terrestrial station, the predetermined time length of the guard interval may be shorter than a length of the guard interval when the radio frame operates based on Universal Time Coordinated (UTC).

According to yet another embodiment, a communication system for unmanned aerial vehicles is provided. The communication system includes: a wireless device and a terrestrial station, wherein the wireless device transmits a downlink signal to the terrestrial station by using a radio frame or receives an uplink signal from the terrestrial station by using the radio frame, and the radio frame includes five subframes and each subframe includes a plurality of slots used for the uplink signal and/or the downlink signal.

DETAILED DESCRIPTION OF THE EMBODIMENTS

Figure 1:
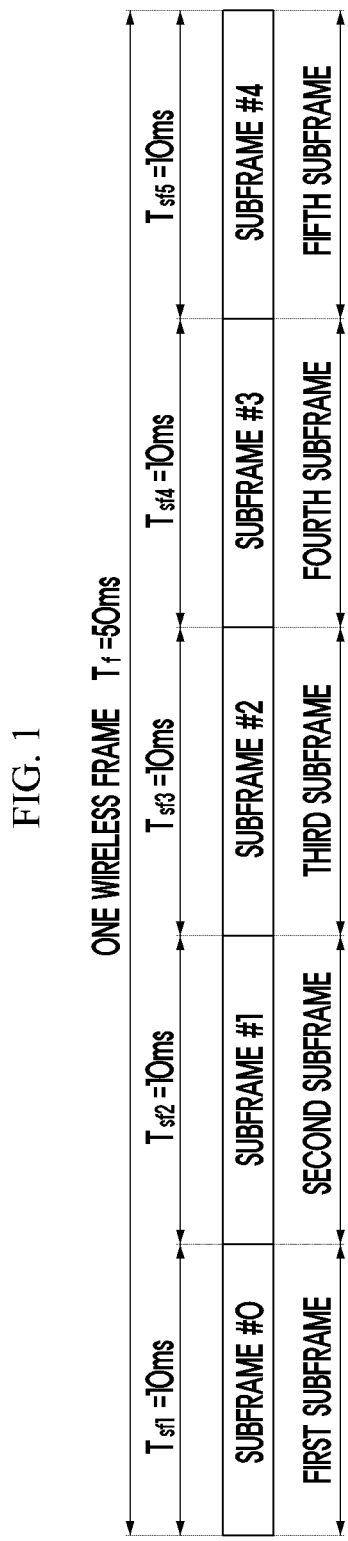
FIG. 1 is a schematic diagram illustrating a radio frame structure for UAV communication according to an embodiment.

In the following detailed description, only certain embodiments have been shown and described, simply by way of illustration. As those skilled in the art would realize, the described embodiments may be modified in various different ways, all without departing from the spirit or scope of the description. Accordingly, the drawings and description are to be regarded as illustrative in nature and not restrictive, and like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, expressions described in the singular may be construed in the singular or plural unless an explicit expression such as "one" or "single" is used.

As used herein, "and/or" includes each and every combination of one or more of the recited elements.

In the specification, it will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present description.

In a flowchart described with reference to drawings in this specification, the order of operations may be changed, several operations may be merged, some operations may be divided, and specific operations may not be performed.

Figure 2:
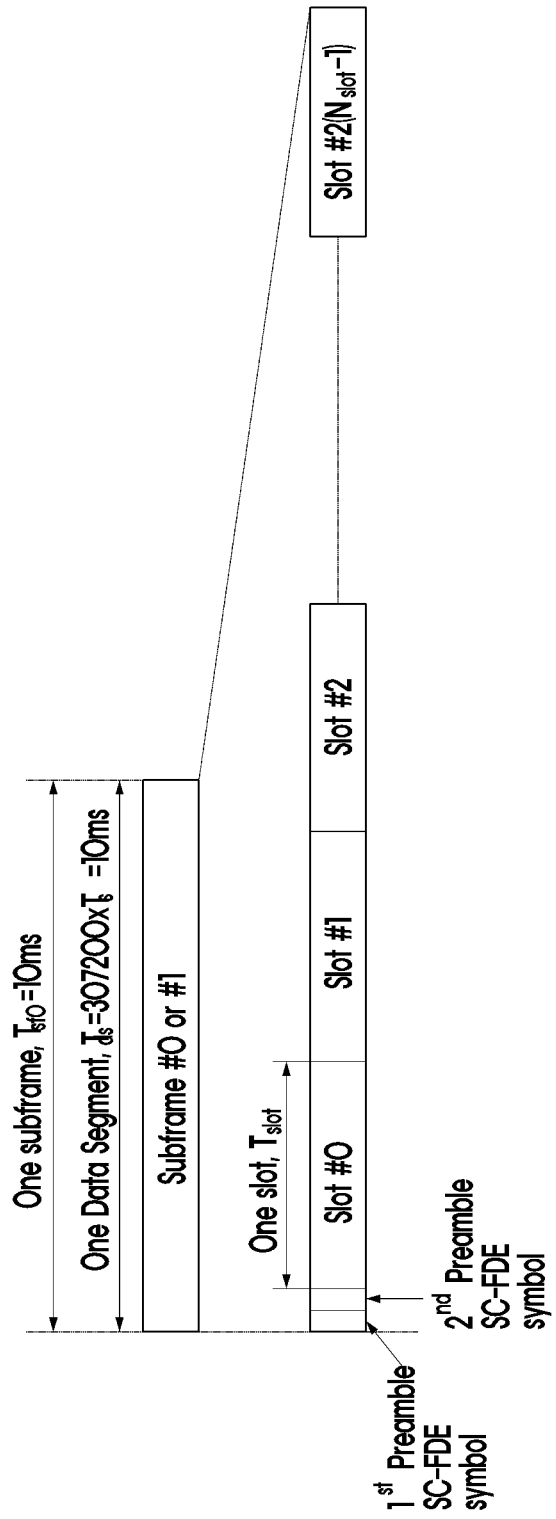
FIG. 2 is a schematic diagram illustrating a subframe for UAV communication according to an embodiment.

FIG. 1 is a schematic diagram illustrating a radio frame structure for UAV communication according to an embodiment and FIG. 2 is a schematic diagram illustrating a subframe for the UAV communication according to an embodiment.

The government has distributed the C band frequency as a licensed band for UAV control and mission for the stable operation of the UAVs and expansion of UAV operations. The C band frequency for control communication is 5030-5091 MHz band, and it is the frequency distributed internationally by ITU-R WRC-12 as the communication frequency for control for the UAV to enter the national airspace stably. The C band frequency for mission communication may be distributed to 5091-5150 MHz band. Communication in the licensed band can a secure communication link more stably than communication in an unlicensed band with low power, and the C band frequency, which is the licensed band, may be used as the auxiliary communication link of the UAV applied to disaster and security situations (main communication link is LTE network).

Below, in order to achieve the above object, in the adjacent band of the communication band for the control of the UAV, it is possible to provide a communication waveform for mission that can operate without interference with the communication for the control of the UAV. The communication waveform for mission of the UAV according to the embodiment may be used for a small and lightweight UAV, operated in a non-line of sight (NLOS) environment, and transmit the control data and the mission data simultaneously. The communication waveform for mission of the UAV according to the embodiment may be applied to the UAV mainly operating in the C band, but is not limited thereto, and may be applied to other systems having a similar operating concept.

In considering the small and lightweight UAV mission scenario according to an embodiment, the new waveform of the mission communication of the UAV needs to satisfy the following requirements.

Maximum transmission rate: 20 Mbps or more when used by one person
Maximum communication radius: 100 km
Maximum number of supported drones: 10
Requires operation in a low-altitude UAV operating environment
   Consider multipath fading
Requires compatibility with the C band communication link for control
   Interference issue with adjacent frequency used for control
Simultaneous transmission of control/mission data is possible in the mission band
   Supports various data rates
Small, lightweight, and low-power design required
   Low PAPR and low complexity receiver design
Configurable waveform that supports not only direction communication link but also bi-directional communication link
Air-to-Air communication link In consideration of the above requirements for mission communication of the UAV, the new waveform technology according to an embodiment may have the following main features.

frame structure
   ms frame structure same as the LTE frame structure for LTE-based upper layer compatibility
   50 ms super frame structure based on GPS same as the frame structure of the C band communication standard technology for control
waveform
   Single transmission wave scheme considering nonlinearity characteristic of an amplifier of a small UAV from the viewpoint of size, weight, and power (SWaP) (excellent PAPR characteristic compared to existing multi-carrier systems such as WiFi)
   Single carrier-frequency domain equalization (SC-FDE) scheme is applied for low-complexity operation even in a multi-fading channel environment
pilot deployment
   Pilot deployment considering the speed of the UAV over 150 km/h
   Pilot deployment considering 1-2 μs delay spread
preamble
   Zadoff-Chu sequence excellent in PAPR characteristic is applied
modulation scheme
   QPSK, 16QAM (or 8PSK)
encoding scheme
   Punctured turbo coding
MCS mode
   Supports various modulation/encode modes (minimum 0.8 Mbps, maximum 20 Mbps or more)
spectrum efficiency
   Transmission filtering (Filtering) is applied to improve the transmission spectrum characteristic According to an embodiment, the multiple access scheme for an uplink mission physical channel (Physical Uplink Payload Channel, PUPCH) may be based on a single-carrier frequency domain equalization (SC-FDE) scheme with a cyclic prefix. As the duplex scheme, time division duplex (TDD) may be applied.

Unless otherwise stated herein, the size of fields of the time domain may be expressed as a time unit of $T_s=1/(15000 \times 2048)$ second. In a downlink frame structure, radio frames with a length of 50 ms may include two subframes having a length of 24.3 ms and 25.7 ms, respectively.

Referring to FIG. 1, the time length of the radio frame is 50 ms ($T_f=50$ ms), and may include five subframes (subframe #0 to subframe #4) having a length of 10 ms ($T_{sf}=10$ ms). The use of each subframe may be determined by an indication of a higher layer. When each subframe is not used, the corresponding subframe may not be transmitted. Twenty radio frames may be transmitted for 1 second, and transmission of the radio frame may be started every second based on Universal Time Coordinated (UTC) time, for example.

Referring to FIG. 2, each subframe has a length of 10 ms ($T_{sfi}=10$ ms, i=1-5), and each subframe may correspond to a continuous data segment. The data segment may include two preamble SC-FDE periods and $N_{sf,slot}$ slot periods. In all subframes, the order and length of the preamble SC-FDE period and the slot period may be the same. A configuration supported for a subframe including $N_{sf,slot}$ slots is shown in Tables 1 and 2 below, and the configuration of the subframe may be determined by a higher layer.

TABLE 1

| Subframe configuration | The number of slots in a subframe, $N_{slot}^{sf}$ |
|---|---|
| 0 | 11 |

The length of a slot according to an embodiment may be the same as Equation 1 below.

$$T_{slot} = N_{slot,blocks} \times (N_{cp,samples} + N_{data\_block,samples}) + N_{slot,pilot\_block} \times (N_{cp,samples} + N_{pilot\_block,samples}) \quad \text{(Equation 1)}$$

One slot may include $N_{slot,data\_blocks}$ of SC-FDE data blocks and $N_{slot,pilot\_block}$ of SC-FDE pilot blocks. The configurations supported for the slots are shown in Table 2 below.

TABLE 2

| Subframe configuration | Number of SC-FDE blocks in a slot Nslot, SC-FDE_blocks | Number of pilot SC-FDE blocks in a slot Nslot, pilot_blocks | Number of data SC-FDE blocks in a slot Nslot, data_blocks |
|---|---|---|---|
| 0 | 24 | 4 | 20 |

Figure 3:
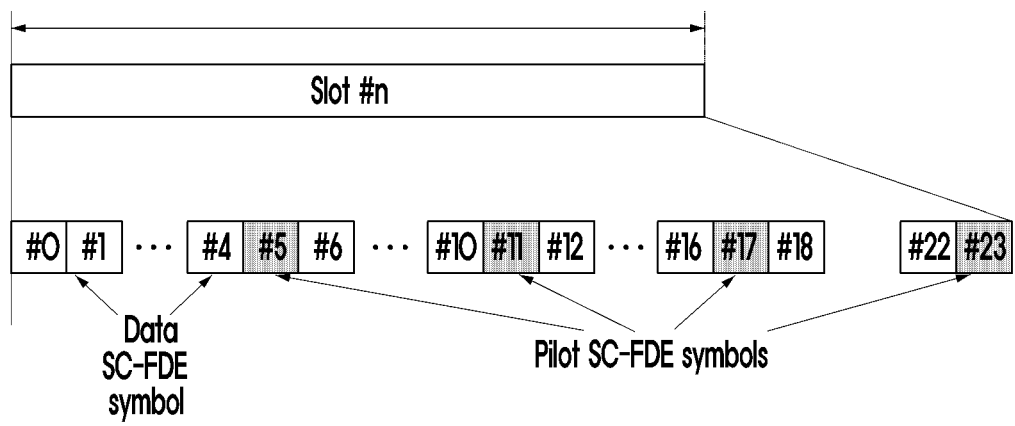
FIG. 3 is a schematic diagram illustrating a slot including a plurality of SC-FDE blocks according to an embodiment.
Figure 4:
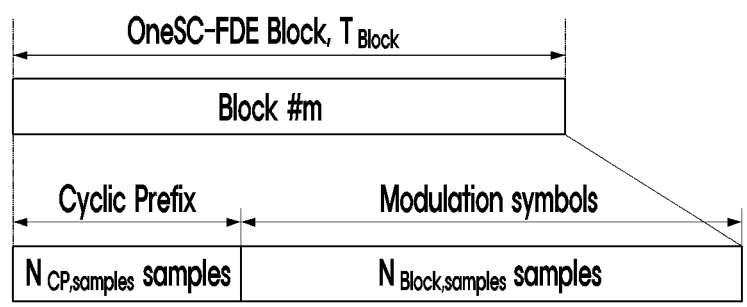
FIG. 4 is a schematic diagram illustrating an SC-FDE block according to an embodiment.

FIG. 3 is a schematic diagram illustrating a slot including a plurality of SC-FDE blocks according to an embodiment and FIG. 4 is a schematic diagram illustrating an SC-FDE block according to an embodiment.

Referring to FIG. 3, 24 SC-FDE blocks may be included in one slot and an SC-FDE pilot block may be deployed every six symbols. The location of the SC-FDE pilot block according to subframe configuration 0 are shown in Table 3 below.

TABLE 3

| Conf. | Spacing between SC-FDE pilot blocks | Location of first SC-FDE pilot block in a slot | Location of second SC-FDE pilot block in a slot | Location of third SC-FDE pilot block in a slot | Location of fourth SC-FDE pilot block in a slot |
|---|---|---|---|---|---|
| 0 | 6 | 5 | 11 | 17 | 23 |

The SC-FDE block may be an SC-FDE pilot block or an SC-FDE data block depending on its form, and its length is as in Equation 2 below.

$$T_{Block}=(N_{cp,samples}+N_{block,samples})\times T_s \quad \text{(Equation 2)}$$

That is, the SC-FDE block may include $N_{cp}$ CP samples (samples of Ts length unit) and $N_{block,samples}$ block samples, and may transfer $M_{block,symbols}$ modulation symbols.

The SC-FDE pilot block and the SC-FDE data block according to an embodiment have the same structure (refer to FIG. 4) and the structure of the SC-FDE block may follow Equation 3 below.

$$T_{Block}=T_{Data\_Block}=T_{Pilot\_Block}$$

$$N_{block,samples}=N_{Data\_block,samples}=N_{Pilot\_block,samples}$$

$$M_{block,symbols}=M_{Data\_block,symbol}=M_{Pilot\_block,symibols} \quad \text{(Equation 3)}$$

In equation 3, $T_{Data\_Block}$ is the time length of the SC-FDE data block and $T_{Pilot\_Block}$ is the time length of the SC-FDE pilot block. $N_{Data\_block,samples}$ is the number of samples included in the SC-FDE data block and $N_{Pilot\_block,samples}$ is the number of samples included in the SC-FDE pilot block. $M_{Data\_block,symbols}$ is the number of modulation symbols included in the SC-FDE data block and $M_{Pilot\_block,symbols}$ is the number of modulation symbols included in the SC-FDE pilot block. The SC-FDE data block and SC-FDE pilot block according to configuration 0 are shown in Table 4 below.

TABLE 4

| Conf. | Number of modulation symbols in SC-FDE block Mblock, symbols | Number of modulation samples in SC-FDE block Nblock, samples | Number of CP symbols in SC-FDE block Mcp, symbols | Number of CP samples in SC-FDE block Ncp, samples |
|---|---|---|---|---|
| 0 | 512 | 2048 | 64 | 256 |

The time length of the SC-FDE pilot block according to an embodiment is shown in Equation 4 below.

$$T_{Pilot\_Block}=(N_{cp,samples}+N_{pilot\_block,samples})\times T_s \quad \text{(Equation 4)}$$

In Equation 4, the SC-FDE pilot block may include $N_{cp,samples}$ CP samples and $N_{pilot\_block,samples}$ pilot samples, and may transfer $M_{pilot\_block,symbols}$ pilot symbol sequences.

The time length of the SC-FDE data block according to an embodiment is as shown in Equation 5 below.

$$T_{data\_Block}=(N_{cp,samples}+N_{data\_block,samples})\times T_s \quad \text{(Equation 5)}$$

In equation 5, the SC-FDE data block may include $N_{cp,samples}$ CP samples and $N_{data\_block,samples}$ data samples, and may transfer $M_{data\_block,symbols}$ data symbol sequences.

In FIG. 2, the time length of the first SC-FDE preamble block in a subframe is as shown in Equation 6 below.

$$T_{1st\_preamble\_block}=(N_{CP,samples}+N_{1st\_preamble\_block,samples})\times T_s \quad \text{(Equation 6)}$$

In equation 6, the first SC-FDE preamble block may include $N_{CP,samples}$ CP samples, $N_{1st\_preamble\_block,samples}$ preamble block samples, and $M_{1st\_preamble\_block,symbols}$ symbol sequences may be transferred. Table 5 shows the first SC-FDE preamble block according to the configuration 0.

TABLE 5

| Conf. | Number of modulation symbols in 1st SC-FDE preamble block M1st_preamble_block, symbols | Number of modulation samples in 1st SC-FDE preamble block N1st_preamble_block, symbols | Number of CP symbols in 1st SC-FDE preamble block Mcp, symbols | Number of CP samples in 1st SC-FDE preamble block Ncp, samples |
|---|---|---|---|---|
| 0 | 512 | 2048 | 256 | 1024 |

In FIG. 2, the time length of the second SC-FDE preamble block is as shown in Equation 7 below.

$$T_{2nd\_preamble\_block}=(N_{CP,samlples}+N_{2nd\_preamble\_block,samples})\times T_s \quad \text{(Equation 7)}$$

In Equation 7, the second SC-FDE preamble block may include $N_{CP,samples}$ CP samples, $N_{2nd\_preamble\_block,samples}$ preamble block samples, and $M_{2nd\_preamble\_block,symbols}$ symbol sequences may be transferred. Table 6 shows the second SC-FDE preamble block according to the configuration 0.

TABLE 6

| Conf. | Number of modulation symbols in $2^{nd}$ SC-FDE preamble block $M_{2nd\_preamble\_block,symbols}$ | Number of modulation samples in $2^{nd}$ SC-FDE preamble block $N_{2nd\_preamble\_block,symbols}$ | Number of CP symbols in $2^{nd}$ SC-FDE preamble block $M_{cp,symbols}$ | Number of CP samples in $2^{nd}$ SC-FDE preamble block $N_{cp,samples}$ |
|---|---|---|---|---|
| 0 | 512 | 2048 | 256 | 1024 |

The first preamble block sequence according to an embodiment may be generated as shown in Equation 8 below through $q_1{}^{th}$ root Zadoff-Chu sequence having a length of prime number (e.g., $M_{1st\_preamble\_block,symbols}$). In equation 8, $q_1$ may have any fixed value.

$$q_1 = N_{cell\_ID} \quad \text{(Equation 8)}$$

The second SC-FDE preamble block sequence and the SC-FDE pilot block sequence according to an embodiment may be generated as shown in equation 9 below through the $q_{2,i}{}^{th}$ root Zadoff-Chu sequence having a length of even number (e.g., $M_{2nd\_preamble\_block,symbols} = M_{pilot\_block,symbols}$).

$$e^{-j2\pi q_{2,i}\left(\frac{m^2}{2} + q_{2,i}m\right)}_{M_{2nd\_preamble\_block,symbols}}, \quad \text{(Equation 9)}$$

$$0 \leq m \leq M_{2nd\_preamble\_block,symbols} - 1$$

Here, $q_{2,i}$ may have various values or may have a fixed value such as $q_{2,i} = 127$.

The generated $q_{2,i}{}^{th}$ root Zadoff-Chu sequence may be divided into a group $u = \{u_0, u_1, \ldots, u_{29}\}$ and $i^{th}$ group $u_i$ may be $q_{2,i}$ ($u_i = q_{2,i}$). A second preamble and pilot block sequence group $x$ may be according to a group hopping pattern predetermined from the generated Zadoff-Chu sequence group $u$. Equation 10 below may represent the second preamble and pilot block sequence group $x$ determined from the Zadoff-Chu sequence group according to a predetermined group hopping pattern.

$$x = (f_{gs}(n_s) + f_{ss}) \bmod 30 \quad \text{(Equation 10)}$$

In equation 10, $f_{gs}(n_s)$ and $f_{ss}$ can be expressed as in equation 11.

$$f_{gs}(n_s) = (\Sigma^7_{i=0} c(8n_s + i) \times 2^i) \bmod 30$$

$$f_{ss} = N_{cell\_ID} \bmod 30 \quad \text{(Equation 11)}$$

In equation 11, 'c' can be obtained from a Gold sequence generator initialized by $c_{init}$. The length of the gold sequence generator may be 31 and equation 12 may represent $c_{init}$.

$$c_{init} = \lfloor N_{Cell\_ID}/30 \rfloor \quad \text{(Equation 12)}$$

In equation 12, the second preamble block sequence has a value of $n_s = 0$, and the $j^{th}$ ($0 \leq j \leq 3$) pilot block sequence in the $i^{th}$ ($0 \leq i \leq 33$) slot may be $n_s = 4xi + j + 1$.

A data symbol sequence may be created through the following process.

For each codeword q, bit block $b^{(q)}(0), \ldots, b^{(q)}(M^{(q)}\text{bit}-1)$ transmitted in codeword q in one slot need to be scrambled by using a cell-specific scrambling sequence before modulation. Here, $M^{(q)}$ bit is the number of bits transmitted in the codeword q. The scrambled bit block $b'^{(q)}(0), \ldots, b'^{(q)}(M^{(q)}\text{bit}-1)$ may be determined as Equation 13 below.

$$\text{For } i < M^{(q)}\text{bit}, b'^{(q)}(i) = (b^{(q)}(i) + c^{(q)}(i)) \bmod 2 \quad \text{(Equation 13)}$$

In equation 13, the scrambling sequence $c^{(q)}(i)$ is described below. The scrambling sequence generator to be described below may be initialized at the start of each slot, and equation 14 indicates the initialization value of the scrambling sequence generator.

$$c_{init} = n_{RNTI} \cdot 2^{15} + n_s \cdot 2^8 + N_{Cell\_ID} \quad \text{(Equation 14)}$$

In equation 14, $n_{RNTI}$ is a value corresponding to an RNTI related to PDPCH transmission transmitted from the higher layer, and $n_s$ may be a slot number. One codeword may be transmitted in each slot.

For each codeword q, the scrambled bit block $b'^{(q)}(0), \ldots, b'^{(q)}(M^{(q)}{}_{block,bit}-1)$ may be modulated based on the PSK-affiliated modulation scheme such as QPSK and 8PSK or the QAM-affiliated modulation scheme such as 16QAM, 64QAM. Considering the SWaP of the wireless device mounted on the UAV, QPSK or 8PSK modulation scheme with good linearity may be selected to use a low-spec high power amplifier. Considering the data transmission rate, higher-order modulation schemes such as 16QAM and 64QAM may be applied. Considering the requirements for HD image transmission and SWaP of the wireless device mounted on the UAV, QPSK, 8PSK, and 16QAM modulation schemes may be applied according to higher layer signaling.

A plurality of generated symbol blocks $d^{(q)}(0), \ldots, d^{(q)}(M^{(q)}{}_{data\_block,symbols}-1)$ may be mapped to the SC-FDE data block in each slot. For each codeword q, the mapped SC-FDE data block sequence $a^{data}{}_{m,l}$ may be determined as in equation 15 below.

$$a^{data}{}_{m,l} = d^{(q)}(n), 0 \leq n < M^{(q)}{}_{data\_block,symbols} \quad \text{(Equation 15)}$$

In equation 15, $m = (n \bmod M_{data\_block,symbols})$, and $l = \lfloor n / M_{data\_block,symbols} \rfloor$. A pseudo noise sequence for scrambling may be determined by a gold sequence of length 31. For $n = 0, 1, \ldots, M_{PN}-1$, an output sequence $c(n)$ having a length of $M_{PN}$ may be determined as in equation 16 below.

$$c(n)(x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{(Equation 16)}$$

In equation 16, $N_c = 1600$, and the first m sequence $x_1$ may be initialized to $x_1(n) = 0$ for $x_1(0) = 1, n = 1, 2, \ldots, 30$. The second m sequence $x_2$ may be initialized by $c_{init}$ using the value $(\Sigma^{30}_{i=0} x_2(i) \times 2^i)$ depending on the application for which the gold sequence is used. For example, if a gold sequence is used for the scrambling, the second m sequence may be initialized to $c_{init} = n_{RNTI} \cdot 2^{15} + n_s \cdot 2^8 + N_{Cell\_ID}$.

For the first SC-FDE preamble block of each subframe, the time-continuous signal $s_{1st\_preamble}(t)$ for the first SC-FDE preamble block may be determined within a predetermined range, and the predetermined range of the time-continuous signal $s_{1st\_preamble}(t)$ may be as equation 17 below.

$$\frac{-M_{filt} \times N_{symbol,oversamples} \times Ts}{2} \leq t < \quad \text{(Equation 17)}$$

$$(N_{cp,samples} + N_{1st\_preamble\_block,samples}) \times Ts +$$

$$\frac{M_{filt} \times N_{symbol,oversamples} \times Ts}{2}$$

In equation 17, $N_{symbol,oversamples}$ may represent the number of samples per a modulation symbol, for example, 4. $M_{filt}$ may indicate the length of the transmission filter pulse $p(t)$ for the modulation symbol. Equation 18 below may represent the time continuous signal $s_{1st\_preamble}(t)$.

$$s_{1st\_preamble}(t) = \sum_{i=0}^{M_{CP,symbols} + M_{1st\_preamble\_block,symbol}} x_{q1}(i)p[(t-iT)] \quad \text{(Equation 18)}$$

In equation 18, the $x_{q1}$ sequence may be a first SC-FDE preamble block sequence, and the modulation symbol period T may be determined as in equation 19 below.

$$T = N_{symbol,oversamples} \times T_s \qquad \text{(Equation 19)}$$

In Equation 18, the transmission filter pulse p(t) for the modulation symbol may have the form of a root-raised cosine filter as in equation 20.

$$p(t) = \begin{cases} \frac{1}{T}\left(1 + \beta\left(\frac{4}{\pi} - 1\right)\right), & t = 0 \\ \frac{\beta}{T\sqrt{2}}\left[\left(1 + \frac{2}{\pi}\right)\sin\left(\frac{\pi}{4\beta}\right) + \left(1 - \frac{2}{\pi}\right)\cos\left(\frac{\pi}{4\beta}\right)\right], & t = \pm\frac{T}{4\beta} \\ \frac{1}{T}\frac{\sin\left(\pi\frac{t}{T}(1-\beta)\right) + 4\beta\frac{t}{T}\cos\left(\pi\frac{t}{T}(1+\beta)\right)}{\pi\frac{t}{T}\left(1 - \left(4\beta\frac{t}{T_{sym}}\right)^2\right)}, \end{cases} \qquad \text{(Equation 20)}$$

otherwise

In equation 20, β is a roll-off index, for example, 0.3.

For the second SC-FDE preamble and pilot block of each subframe, the time continuous signal $s_{2nd\_preamble/pilot}(t)$ for the second SC-FDE preamble or the pilot block may be determined within a predetermined range. Here, the predetermined range may be the same as equation 21 below.

$$\frac{-M_{filt} \times N_{symbol,oversamples} \times T_s}{2} \leq t <$$
$$(N_{cp,samples} + N_{2nd\_preamble/pilot\_block,samples}) \times T_s +$$
$$\frac{M_{filt} \times N_{symbol,oversamples} \times T_s}{2} \qquad \text{(Equation 21)}$$

In equation 21, $N_{symbol,oversamples}$ may represent the number of samples per a modulation symbol, and may be, for example, 4. $M_{filt}$ may indicate the length of the transmission filter pulse p(t) for the modulation symbol. The time continuous signal $s_{2nd\_preamble/pilot}(t)$ may be determined as in equation 22 below.

$$s_{2nd\_preamble/pilot}(t) = \sum_{i=0}^{M_{CP,symbols} + M_{2nd\_preamble\_block,symbol}} x_{q2}(i)p[(t - iT)] \qquad \text{(Equation 22)}$$

In equation 22, the $x_{q2}$ sequence may represent the second SC-FDE preamble and pilot block sequence generated according to the second SC-FDE preamble and pilot block sequence generation method.

For the $l^{th}$ SC-FDE data block of each subframe, a time continuous signal $s_{data,l}(t)$ may be determined within a predetermined range. Here, the predetermined range may follow Equation 23 below.

$$\frac{-M_{filt} \times N_{symbol,oversamples} \times T_s}{2} \leq$$
$$t < (N_{cp,samples} + N_{data\_block,samples}) \times T_s +$$
$$\frac{M_{filt} \times N_{symbol,oversamples} \times T_s}{2} \qquad \text{(Equation 23)}$$

In equation 23, $N_{symbol,\ oversamples}$ may represent the number of samples per a modulation symbol, for example, 4. $M_{filt}$ may indicate the length of the transmission filter pulse p(t) for the modulation symbol. A timecontinuous signal $s_{data,l}(t)$ determined within a predetermined range for the $l^{th}$ SC-FDE data block may be the same as in equation 24 below.

$$s_{data,l}(t) = \sum_{i=0} a_{m,l}(i)p(t - iT) \qquad \text{(Equation 24)}$$

In Equation 24, the $a_{m,l}$ sequence may represent the $m^{th}$ modulation symbol sequence of the $l^{th}$ SC-FDE data block in the slot, and may be the same as in equation below.

$$m = \begin{cases} i + M_{data\_block,symbols} - M_{cp,symbols} & \text{for } i < M_{cp} \\ i - M_{cp,symbols} & \text{for } i \geq M_{cp} \end{cases} \qquad \text{(Equation 25)}$$

The symbol data rate $R_{mod}$ may be 15,680,000 sps (symbols per second), and considering the roll-off index (e.g., 0.3) of the root-raised cosine symbol transmission filter, the transmission bandwidth may be 19,968,000 Hz.

For encoding of information bits coming down from higher layers, data in the form of one transport block may be transferred to an encoder (coding unit or coder) for every slot, and an encoding may be performed through the following steps like the turbo coding method.

Insert CRC into a transmission block
Divide into code blocks and insert CRC into the code blocks
turbo coding
Rate matching
Concatenation of the code blocks
Multiplexing The following channel interleaving may be additionally applied to the encoded bit as above. The vector sequence input to a channel interleaver may be as shown in equation 26 below.

$$g_0, g_1, g_2, g_3, \ldots, g_{H'-1} \qquad \text{(Equation 26)}$$

In equation 26, H' may represent the number of entire modulation symbols in a slot. The bit sequence output from the channel interleaver may be derived as shown in (1) to (4) below.

(1) In the number of columns of a matrix ($C_{mux}$, $C_{mux} = N_{slot,data\_blocks}$), columns of the matrix may be numbered as 0, 1, . . . , $C_{mux-1}$ from the left column. Here, $N_{slot,data\_blocks}$ may indicate the number of SC-FDE data blocks in a slot.

(2) In the number of rows in the matrix ($R_{mux}$, $R_{mux} = (H' \cdot Q_m)/C_{mux}$), $R'_{mux}$ may be according to equation 27 below.

$$R'_{mux} = R_{mux}/Q_m \qquad \text{(Equation 27)}$$

The rows of a rectangular matrix may be numbered 0, 1, . . . , $R_{mux}-1$ from the top.

(3) The input vector sequence $g_k$ (k=0, 1, . . . , H'−1) is a set unit of $Q_m$ columns and may be expressed as a ($C_{mux} \times R_{mux}$) matrix. At this time, a vector sequence may be input from vector $y_o$ including from column 0 to column $Q_m-1$ of matrix 0. The input of the vector sequence may be skipped for the matrix items already input in the matrix ($C_{mux} \times R_{mux}$). Equation 28 below may represent a ($C_{mux} \times R_{mux}$) matrix.

$$\begin{bmatrix} \underline{y}_0 & \underline{y}_1 & \cdots & \underline{y}_{C_{max}-1} \\ \underline{y}_{C_{max}} & \underline{y}_{C_{max}+1} & \cdots & \underline{y}_{2C_{max}-1} \\ \vdots & \vdots & \ddots & \vdots \\ \underline{y}_{(R'_{max}-1)\times C_{max}} & \underline{y}_{(R'_{max}-1)\times C_{max}+1} & \cdots & \underline{y}_{(R'_{max}\times C_{max}-1)} \end{bmatrix} \quad \text{(Equation 28)}$$

The pseudocode related to the input of the vector sequence may be the same as equation 29 below.

Set $i,k=0$.

while $k < \underline{y}_i = \underline{g}_k$ $k=k+1$ $i=i+1$ end while (Equation 29)

(4) The output of the block interleaver may be a bit sequence that is read as a column by column of a $(C_{mux} \times R_{mux})$ matrix. The vector sequence after the channel interleaving may be expressed as equation 30 below.

$$h_0, h_1, h_2, h_3, \ldots, h_{H-1} \quad \text{(Equation 30)}$$

The modulation order and transport block size TBS are determined as shown in Table 7 below according to the modulation and encoding scheme. Index $I_{MCS}$ for modulation and encoding scheme may be given by a higher layer.

TABLE 7

| | configuration 0 | | | configuration 1 | |
|---|---|---|---|---|---|
| MCS index ($I_{MCS}$) | Modulation order ($Q_m$) | TBS of conf. 0 (A) | MCS index ($I_{MCS}$) | Modulation order ($Q_m$) | TBS of conf. 1 (A) |
| 0 | 2 | 2088 | 0 | 2 | 2088 |
| 1 | 2 | 4264 | 1 | 2 | 4264 |
| 2 | 2 | 7480 | 2 | 2 | 7480 |
| 3 | 3 | 10296 | 3 | 4 | 10296 |
| 4 | 3 | 12960 | 4 | 4 | 12960 |
| 5 | 3 | 25456 (or 26416) | 5 | 4 | 25456 (or 26416) |

An airborne radio station (ARS) of the UAV may control the transmission power of a physical channel for downlink missions (PDPCH). The ARS may selectively apply the power control scheme.

When the ARS does not transmit a physical channel for downlink control (PDCCH) and a PDPCH channel simultaneously in a subframe i, the ARS transmission power for the PDPCH transmission may be determined as in equation 31 below.

$$P_{PUWCH}(i) = \min \begin{Bmatrix} 10 \log_{10}(\hat{P}_{CMAX}), \\ 10 \log_{10}(P_{O\_PUWCH}(j) + PL) \end{Bmatrix} [dbm] \quad \text{(Equation 31)}$$

When the ARS transmits the physical channel for downlink control (PDCCH) and the PDPCH channel simultaneously in a subframe i, the transmission power of the ARS for the PDPCH transmission may be determined as in equation 32 below.

$$P_{PUWCH}(i) = \min \begin{Bmatrix} 10 \log_{10}(\hat{P}_{CMAX} - \hat{P}_{PUCCH}(i)), \\ 10 \log_{10}(P_{O\_PUWCH}(j) + PL) \end{Bmatrix} \quad \text{(Equation 32)}$$

In equation 32, $P_{CMAX}$, $\hat{P}_{PDCCH(i)}$, $P_{O\_PDPCH}$, and PL are linear values, respectively, and may be determined by a higher layer. $P_{CMAX}$ is the ARS transmission power and $\hat{P}_{PDCCH(i)}$ is the transmission power of the PDCCH channel. $P_{O\_PDPCH}$ is a parameter for the target PDPCH reception power received by the serving terrestrial station (GRS), which is determined by the upper layer. PL is an estimated value of dB scale downlink path loss for the serving GRS, which is calculated by the ARS. The estimate value PL of the path loss may be calculated as $PL = PUCCH_{RSTP} - PUCCH_{RSRP}$. Here, $PUCCH_{RSTP}$ is a transmission power value of a PUCCH reference signal provided by a higher layer and $PUCCH_{RSRP}$ is a reception power value of a PUCCH reference signal provided by a higher layer.

FIG. 5A to FIG. 5G is a schematic diagram illustrating the configuration of a radio frame including a plurality of slots according to an embodiment.

Figure 5A:
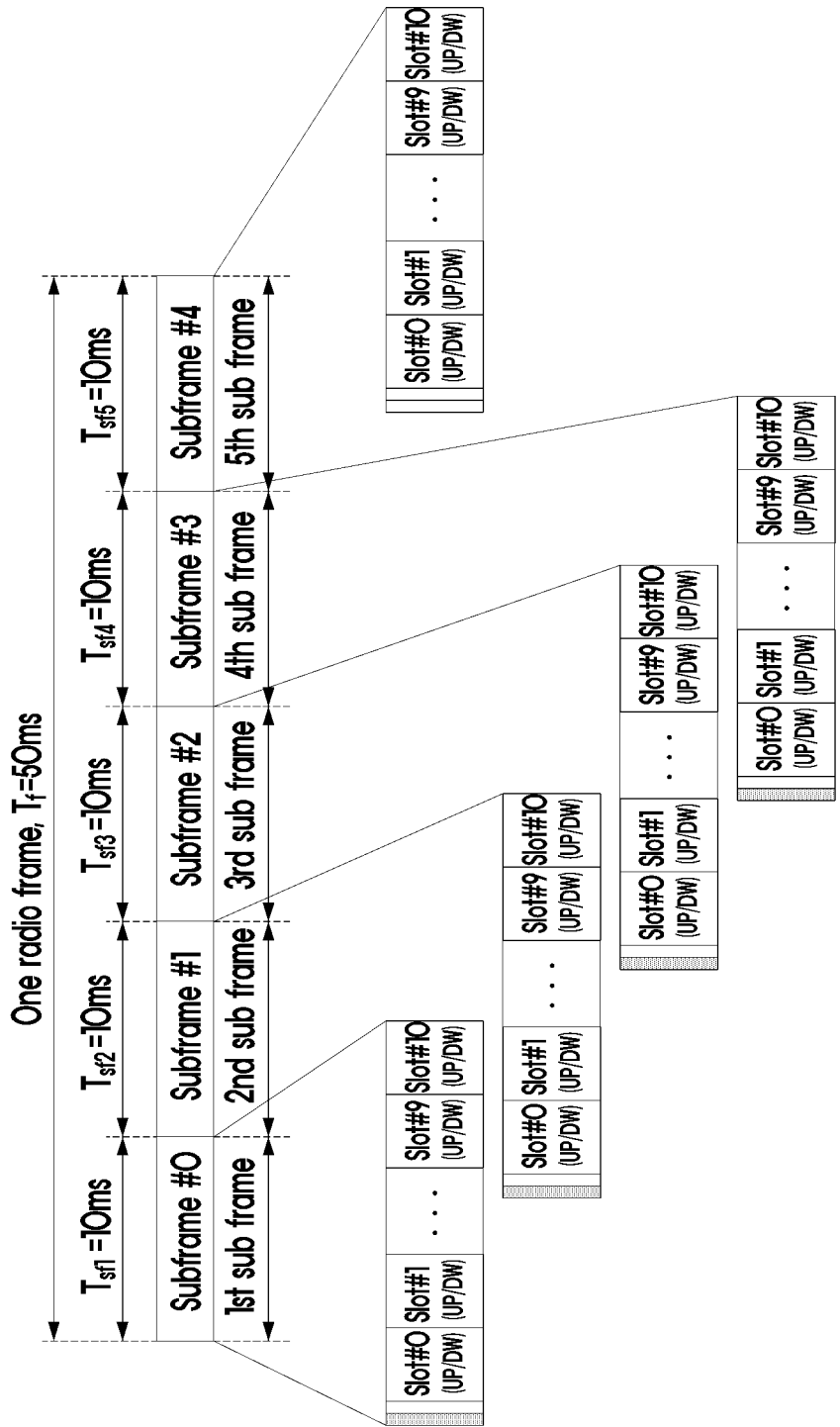
FIG. 5A to FIG. 5G are a schematic diagram illustrating configurations of the radio frame including a plurality of slots according to an embodiment.

In an embodiment, various configurations may be implemented using the same frame structure by allocating various roles to slots included in the radio frame. In addition to the frame configuration presented in FIG. 5, another configuration may be possible for the following purposes.

transmission of uplink data
transmission of downlink data
guard interval in which no signal is transmitted
transmission of uplink control channel information
transmission of uplink broadcasting channel information
transmission of random access channel FIG. 5A shows frame structure 1 used in single direction and bi-directional mode for P2P (point to point). For P2P single direction/bi-directional mode, when there is no interference by communications for control, the onboard wireless station (e.g., drone) and the terrestrial station may arbitrarily configure slots for uplink (terrestrial station→onboard wireless station) and downlink (onboard wireless station→terrestrial station). For example, when all slots are configured as the downlink (DW) by the media access control MAC layer, the frame structure 1 may be used for downlink single direction continuous data transmission. When all slots are configured as the uplink (UP) by the MAC layer, the frame structure 1 may be used for uplink single direction continuous data transmission. The onboard wireless station and the terrestrial station may determine which slot included in the frame structure 1 is allocated to the downlink or to the uplink. That is, the allocation of the slots included in the subframe for the uplink or downlink may be determined by agreement between the onboard wireless station and the terrestrial station.

Figure 5B:
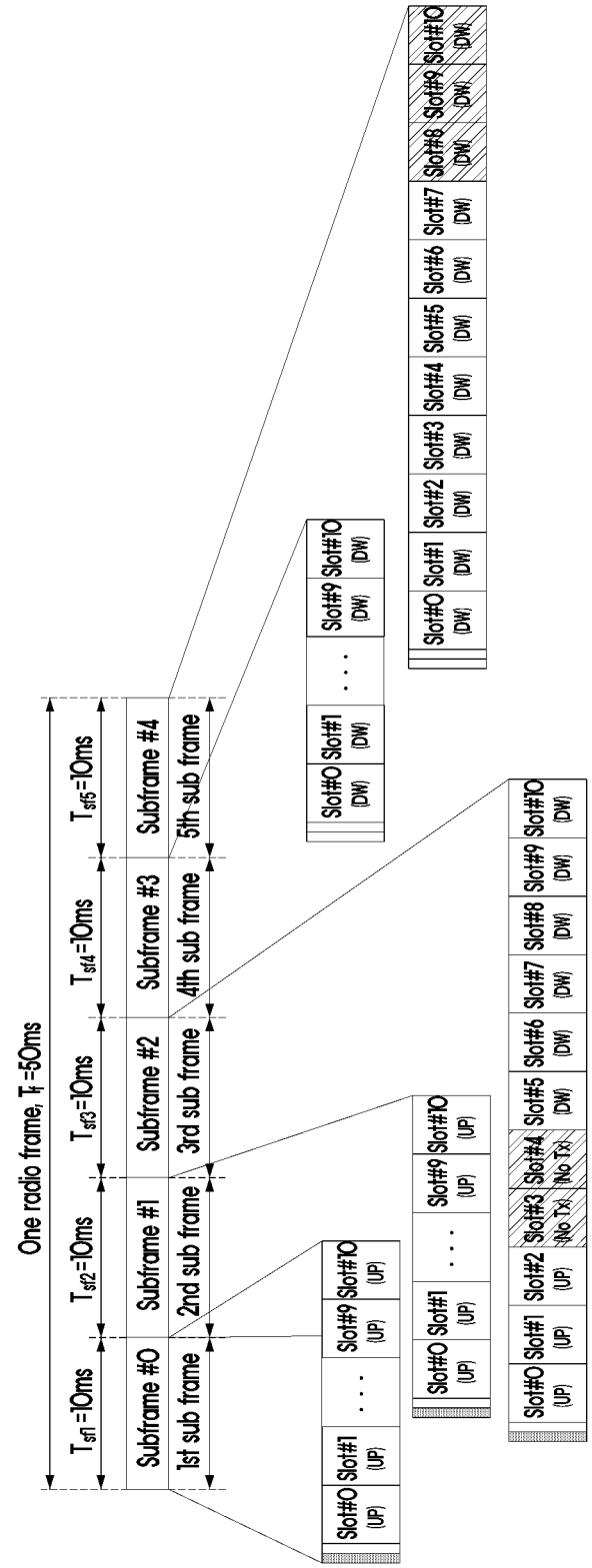

FIG. 5B represents frame structure 2 used in the P2P bi-directional mode. In the frame structure 2, all slots of subframes #0 and #1 and slots #0 to slot #2 in subframe #2 may be configured for the uplink, and the remaining slots may be configured for the downlink. That is, the frame structure 2 may include a slot structure that can match the timing between the communication for control and the uplink and downlink of the mission band when there is interference by the communication for control. C band communication for control may have a frame structure of 50 ms length including a first subframe of 23 ms length, a guard interval of 1.3 ms length thereafter, a second subframe of 23 ms length thereafter, and a guard interval of 2.7 ms length after that.

Figure 5C:
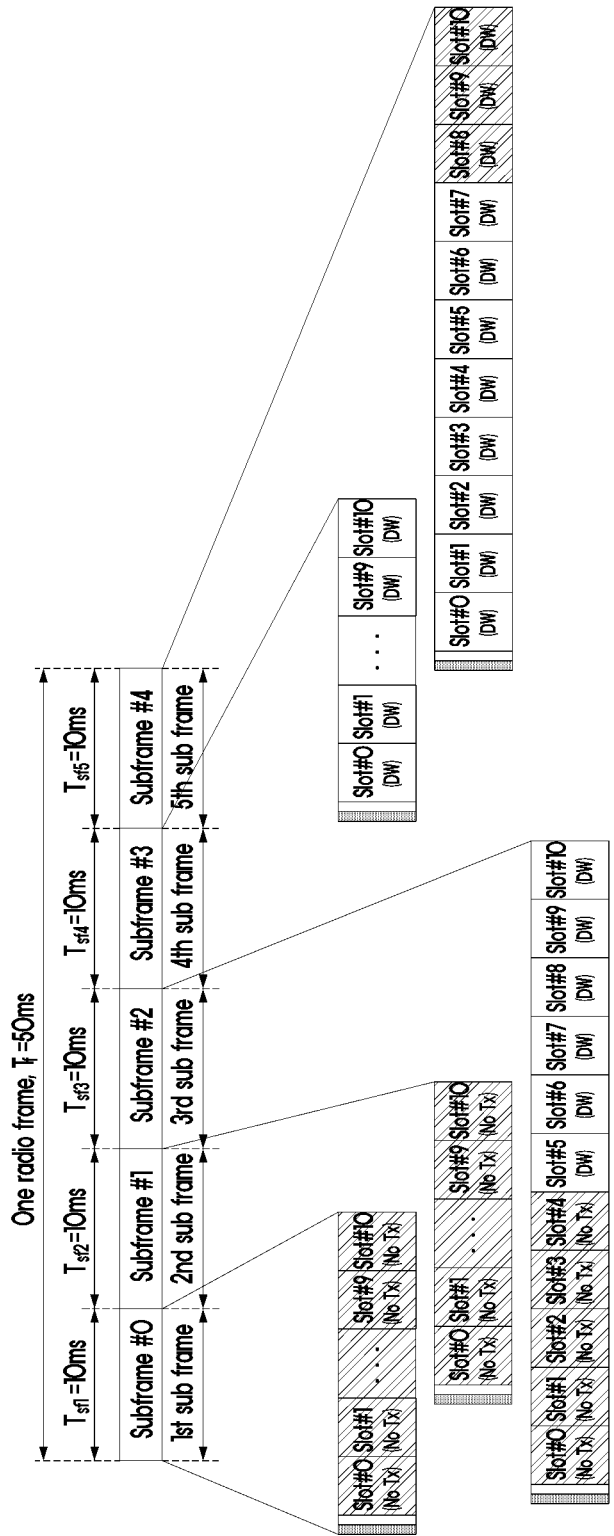

FIG. 5C shows frame structure 3 used as a mode for the onboard wireless station to send a large video, etc. to the terrestrial station in downlink when there is interference by communication for control. Slots in the frame structure 3 are generally similar to the frame structure 2, but all slots predetermined for the uplink in the frame structure 2 are not used in the frame structure 3 (No Tx). For example, since the data signal for mission is transmitted in the uplink of communication for control when the frame structure 3 is used, interference with communication for control may be avoided.

Figure 5D:
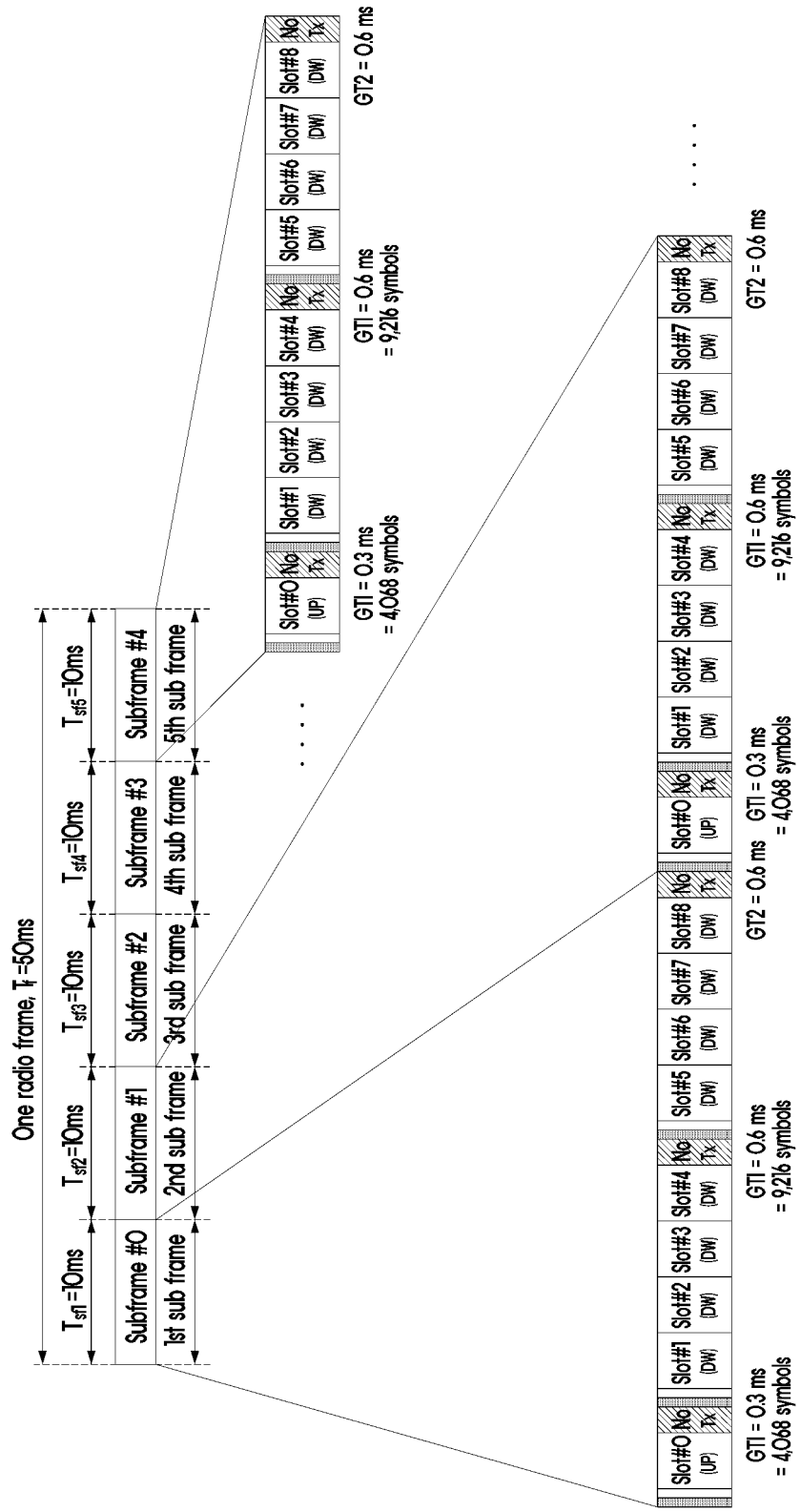

FIG. 5D represents frame structure 4 of bi-directional mode 1 for P2MP (point to multipoint). The frame structure 4 is a frame structure in which it is considered that control communication has a bi-directional characteristic and mission communication has mainly a single direction characteristic. In the frame structure 4, control data and mission data may be simultaneously transmitted in a mission band. Each subframe of the frame structure 4 may support two UAVs, and 10 UAVs may be simultaneously supported within a radio frame with a total length of 50 ms. Slot #0 of each subframe in the frame structure 4 may be used as an uplink capable of transmitting uplink information to all onboard wireless stations to which terrestrial stations are connected. One uplink slot and eight downlink slots may be included in each subframe. Since two UAVs are supported in each subframe, uplink telecommand data for two UAVs may be multiplexed and transmitted in the slot #0. If necessary, modem control data information such as a header for distinguishing data to the two UAVs may also be multiplexed and transmitted. A guard time interval GTI to avoid interference may be set between the uplink slot and the downlink slot, and each UAV may transmit downlink data in four consecutive slots. In the transmission section of downlink data, telemetry data for control, data for mission, and data for modem control may be multiplexed and transmitted. For such frame configuration, the onboard wireless station and the terrestrial station may operate according to the UTC absolute timing reference using GNSS such as GPS.

Figure 5E:
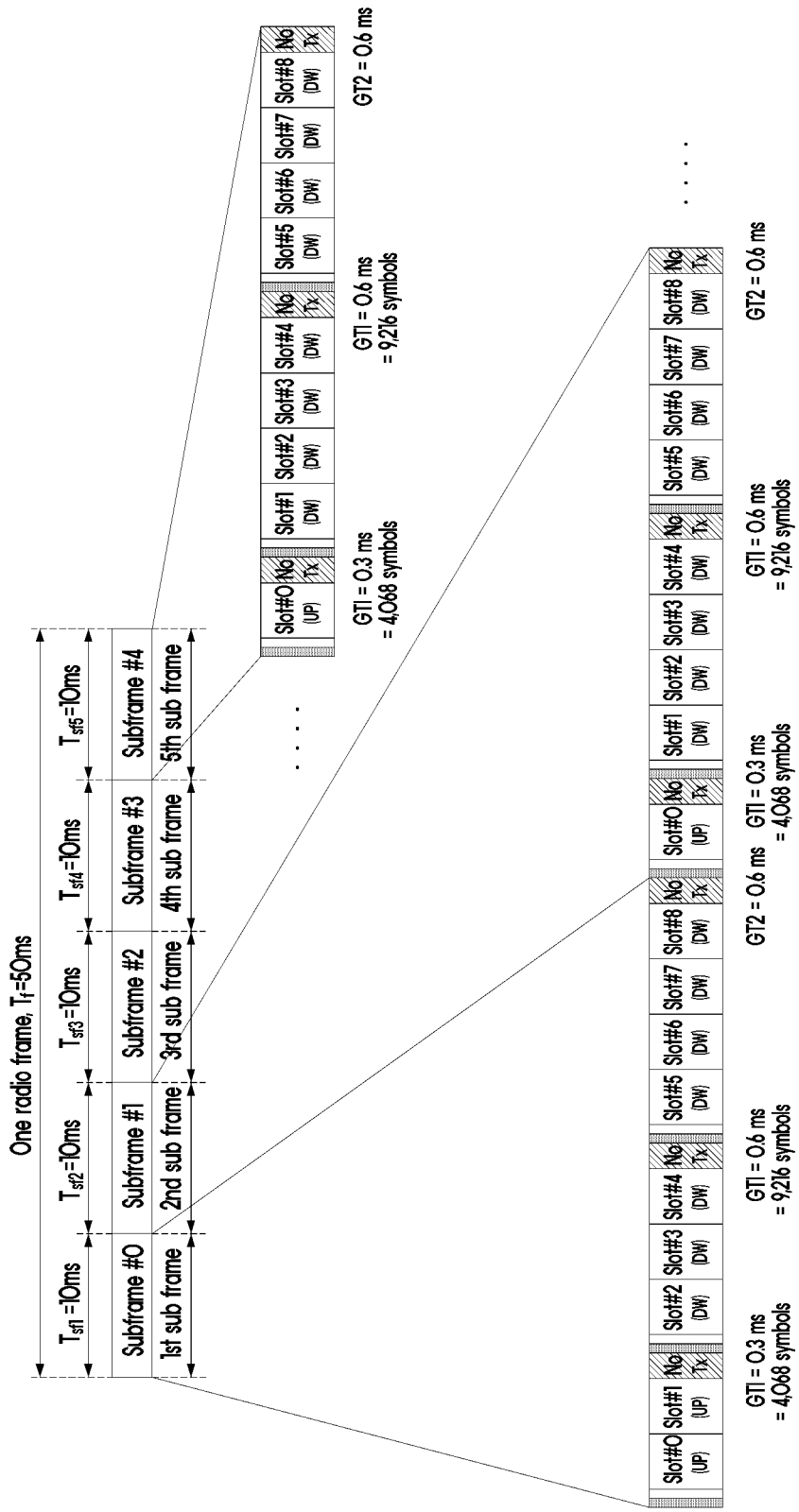

FIG. 5E represents frame structure 5 of bi-directional mode 2 for P2MP. The frame structure 5 is similar to the frame structure 4, and an uplink slot for a broadcasting channel is additionally included in the first subframe. Through the broadcasting channel of the added uplink slot, the terrestrial station may control the onboard wireless station and may transmit data for system information to change the setting. For example, in slot #0, broadcasting data or broadcasting data+control data may be transmitted, and in slot #1, telecommand data or telecommand data+ control data for UAVs supported in a subframe including slot #1 may be transmitted.

Figure 5F:
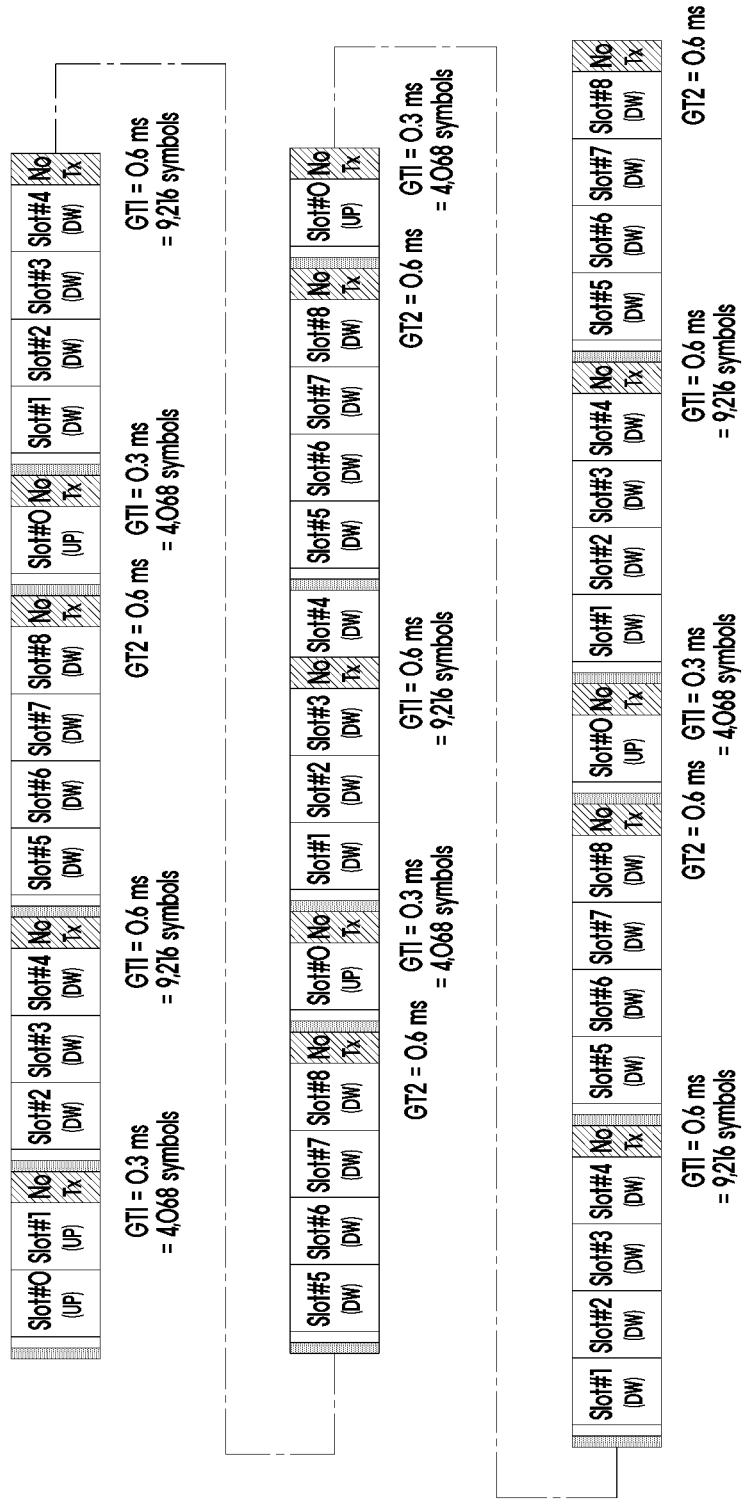

FIG. 5F represents frame structure 6 of bi-directional mode 3 for P2MP. The frame structure 6 is similar to the frame structure 5, and a downlink slot for a random access RA channel is additionally allocated. For example, referring to FIG. 5F, slot #4 of subframe #2 may be allocated as a downlink slot for the random access. The random access channel of the frame structure 5 may be to support a procedure for a terminal to initially access the terrestrial station and start communication.

Figure 5G:
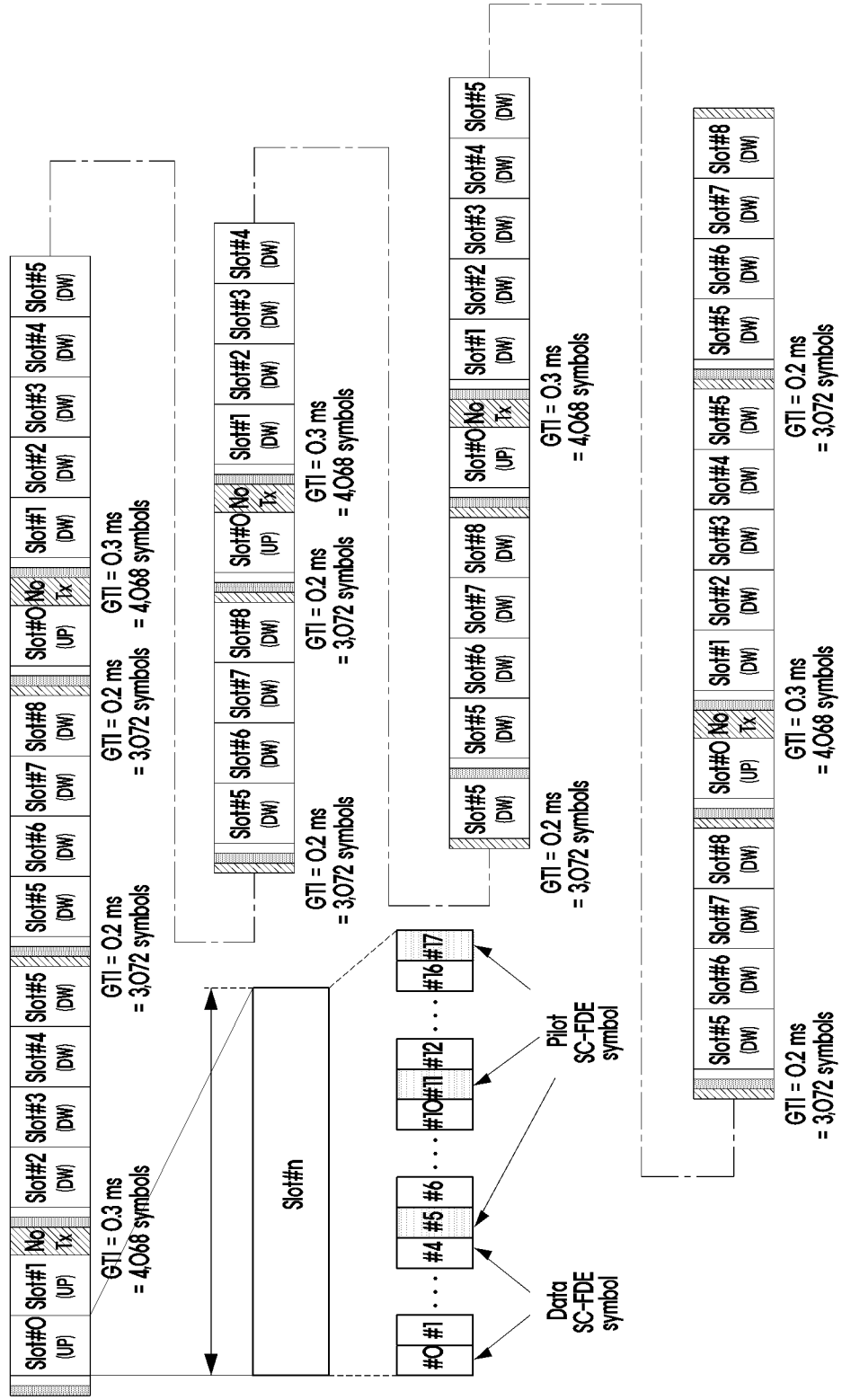

FIG. 5G represents frame structure 7 of bi-directional mode 4 for P2MP. The frame structure 7 may support a broadcasting channel and a random access channel like the frame structure 6, and may be used for terrestrial station-centered synchronization. That is, unlike the rest of the frame structure, the frame structure 7 does not follow UTC-based absolute timing synchronization, so a GTI between downlink slots of the terrestrial stations and/or a GTI when switching from the downlink slot to the uplink slot may be relatively short. For example, by the frame structure 7, the terrestrial wireless station may determine the position of the UAV through the random-access channel attempted by the UAV, and the UAV may transmit downlink transmission timing information to the terrestrial wireless station, so that the length of the guard interval required in the downlink between the terrestrial wireless station and the UAV can be reduced.

In addition to that shown in FIG. 5A to FIG. 5G, in the case of other uplink/downlink asymmetric traffic, such as when uplink traffic is more than downlink traffic, a frame structure for a case where guard intervals of different duration are required according to the operating radius may also be determined. As described above, by using the communication waveform for the mission according to the embodiment, the uplink/downlink data for the mission of the UAV may be transmitted without interference with the communication for control in the adjacent band. The UAV using the communication waveform for mission according to the embodiments may be down-sized and lightweight.

Figure 6:
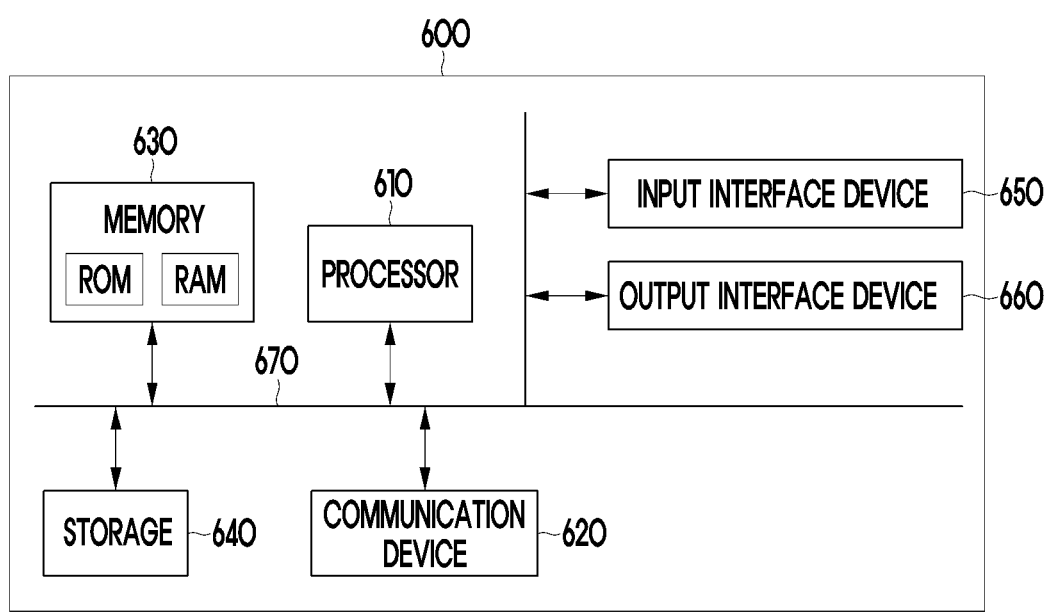
FIG. 6 is a block diagram illustrating a wireless device according to an embodiment.

FIG. 6 is a block diagram illustrating a wireless device according to an embodiment.

The wireless device according to an embodiment may be implemented as a computer system, for example, a computer-readable medium. Referring to FIG. 6, the computer system 600 may include at least one of a processor 610, a memory 620, an input interface device 650, an output interface device 660, and a storage device 640 communicating through a bus 670. The computer system 600 may also include a communication device 620 coupled to the network. The processor 610 may be a central processing unit (CPU) or a semiconductor device that executes instructions stored in the memory 630 or the storage device 640. The memory 630 and the storage device 640 may include various forms of volatile or nonvolatile storage media. For example, the memory may include a read only memory (ROM) or a random-access memory (RAM).

In the embodiment of the present disclosure, the memory may be located inside or outside the processor, and the memory may be coupled to the processor through various means already known. The memory is a volatile or nonvolatile storage medium of various types, for example, the memory may include a read-only memory (ROM) or a random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 620 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of the number of specific implements, but it should be understood that the details do not limit any invention or what is claimable in the specification but rather describe features of the specific example embodiment.

Features described in the specification in the context of individual example embodiments may be implemented as a combination in a single example embodiment.

In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments. On the contrary, it is intended to cover various modifications and equivalent arrangements included within the spirit and scope of the appended claims.

What is claimed is:

1. A wireless device mounted on an unmanned aerial vehicle, the wireless device comprising:
    a processor, a memory, and a communication device, wherein the processor is connected to the communication device and executes a program stored in the memory to perform:
    transmitting a downlink signal to a terrestrial station by using a radio frame and receiving an uplink signal from the terrestrial station by using the radio frame, wherein
    the radio frame includes five subframes and each subframe includes a plurality of slots used for the uplink signal and/or the downlink signal, and
    the transmitting of the downlink signal to the terrestrial station by using the radio frame or receiving the uplink signal from the terrestrial station by using the radio frame comprises:
        receiving the uplink signal through first two subframes among the five subframes;
        receiving the uplink signal through a slot in a first part of a third subframe among the five subframes and transmitting the downlink signal through a slot after the slot in the first part of the third subframe; and
        transmitting the downlink signal through last two subframes among the five subframes.

2. The wireless device of claim 1, wherein:
    at least one subframe of the five subframes includes a slot in which both the uplink signal and the downlink signal is not allocated.

3. The wireless device of claim 1, wherein:
    when at least one subframe of the five subframes includes both an uplink slot to which the uplink signal is allocated and a downlink slot to which the downlink signal is allocated, a guard interval is included between the uplink slot and the downlink slot.

4. The wireless device of claim 3, wherein:
    a time length of the guard interval is shorter than the uplink slot and the downlink slot.

5. The wireless device of claim 1, wherein:
    at least one slot of the plurality of slots includes a broadcasting channel or a random access (RA) channel.

6. The wireless device of claim 1, wherein:
    a slot of the plurality of slots includes a plurality of single carrier-frequency domain equalization (SC-FDE) blocks and at least one SC-FDE block includes an SC-FDE data block and an SC-FDE pilot block.

7. The wireless device of claim 6, wherein:
    a number of the SC-FDE pilot blocks is less than a number of the SC-FDE data blocks and the SC-FDE pilot block is positioned at predetermined intervals within the slot.

8. The wireless device of claim 1, wherein:
    each subframe includes a first preamble SC-FDE symbol and a second preamble SC-FDE symbol and a plurality of slots are positioned after the first preamble SC-FDE symbol and the second preamble SC-FDE symbol.

9. The wireless device of claim 8, wherein:
    a block sequence corresponding to the first preamble SC-FDE symbol is generated based on a cell identifier and a Zadoff-Chu sequence having a length of prime number.

10. The wireless device of claim 8, wherein:
    a block sequence corresponding to the second preamble SC-FDE symbol and a pilot block sequence are generated according to a group hopping pattern and a Zadoff-Chu sequence having a length of even number.

11. A communication method for a wireless device, the communication method comprising:
    transmitting a downlink signal to a terrestrial station by using a radio frame or receiving an uplink signal from the terrestrial station by using the radio frame, wherein
    the radio frame includes five subframes and each subframe includes a plurality of slots used for the uplink signal and/or the downlink signal, and
    the transmitting of the downlink signal to the terrestrial station by using the radio frame or receiving the uplink signal from the terrestrial station by using the radio frame comprises:
        transmitting/receiving no signal with the terrestrial station in first two subframes and a slot in a first part of a third subframe among the five subframes; and
        transmitting the downlink signal through a slot after the slot in the first part of the third subframe.

12. The communication method of claim 11, further comprising:
    determining allocation of a slot for the uplink signal or the downlink signal by the wireless device and a terrestrial station.

13. A communication method for a wireless device, the communication method comprising:
    transmitting a downlink signal to a terrestrial station by using a radio frame or receiving an uplink signal from the terrestrial station by using the radio frame, wherein
    the radio frame includes five subframes and each subframe includes a plurality of slots used for the uplink signal and/or the downlink signal,
    the transmitting a downlink signal to a terrestrial station by using a radio frame or receiving an uplink signal from the terrestrial station by using the radio frame comprises:
        receiving the uplink signal from the terrestrial station in a first slot of a first subframe among the five subframes;
        transmitting the downlink signal to the terrestrial station through a slot after the first slot in the first subframe or some slots in the remaining subframes; and
        receiving a broadcasting signal from the terrestrial station through the second slot following the first slot in the first subframe, and
    a slot in a third subframe among the five subframes is allocated for random access (RA) of other wireless devices.

14. The communication method of claim 13, wherein:
    a guard interval of a predetermined time length is allocated between a slot in which the uplink signal is received and a slot in which the downlink signal is transmitted.

15. The communication method of claim 14, wherein:
when the radio frame is synchronized with respect to the terrestrial station, the predetermined time length of the guard interval is shorter than a length of the guard interval when the radio frame operates based on Universal Time Coordinated (UTC).

* * * * *